(12) United States Patent
Amano

(10) Patent No.: US 8,259,220 B2
(45) Date of Patent: Sep. 4, 2012

(54) IMAGING DEVICE CONTAINING A ROTARY SHUTTER FOR FRAME RATE CONTROLLING

(75) Inventor: Ryosuke Amano, Tokyo (JP)

(73) Assignee: Sony Corporation, Tokyo (JP)

( * ) Notice: Subject to any disclaimer, the term of this patent is extended or adjusted under 35 U.S.C. 154(b) by 461 days.

(21) Appl. No.: 12/501,517

(22) Filed: Jul. 13, 2009

(65) Prior Publication Data
US 2010/0013946 A1    Jan. 21, 2010

(30) Foreign Application Priority Data
Jul. 15, 2008    (JP) ................................. P2008-183983

(51) Int. Cl.
*H04N 5/238*    (2006.01)
*H04N 5/235*    (2006.01)

(52) U.S. Cl. ......... 348/368; 348/362; 348/363; 348/367

(58) Field of Classification Search .................. None
See application file for complete search history.

(56) References Cited

U.S. PATENT DOCUMENTS

| | | | |
|---|---|---|---|
| 4,257,693 A | 3/1981 | Hirata et al. | |
| 4,322,140 A | 3/1982 | Takimoto et al. | |
| 4,551,763 A | 11/1985 | Swinehart et al. | |
| 4,576,456 A | 3/1986 | Okino et al. | |
| 4,643,548 A | 2/1987 | Swinehart | |
| 4,729,018 A * | 3/1988 | Watanabe et al. | 348/69 |
| 7,276,686 B2 | 10/2007 | Haubmann | |
| 7,903,169 B2 * | 3/2011 | Kobayashi | 348/362 |
| 2005/0220447 A1 * | 10/2005 | Ito | 396/17 |
| 2006/0285831 A1 * | 12/2006 | Tanaka | 386/112 |
| 2007/0097224 A1 * | 5/2007 | Haneda | 348/221.1 |
| 2007/0147810 A1 * | 6/2007 | Sugimoto et al. | 396/17 |
| 2008/0151087 A1 * | 6/2008 | Matsumoto | 348/296 |
| 2009/0096902 A1 * | 4/2009 | Kobayashi | 348/296 |

FOREIGN PATENT DOCUMENTS

| | | |
|---|---|---|
| JP | 11 88764 | 3/1999 |
| JP | 2003 190089 | 7/2003 |
| JP | 2006-308841 | 11/2006 |

* cited by examiner

*Primary Examiner* — Lin Ye
*Assistant Examiner* — John H Morehead, III
(74) *Attorney, Agent, or Firm* — Frommer Lawrence & Haug LLP; William S. Frommer; Ellen Marcie Emas

(57) ABSTRACT

Disclosed herein is an imaging device including: an imaging element configured to carry out photoelectric conversion of subject image light incident through a lens and produce a video signal; an imaging element controller configured to control timing of readout of the video signal from the imaging element; a circular disk shutter configured to have a light-blocking part and a passage part, the shutter being driven to rotate by a motor; a shutter position detector configured to detect a rotational position of the shutter; and a shutter controller configured to control a rotational speed of the shutter and cause the imaging element controller to start readout of a video signal from the imaging element when the light-blocking part of the shutter is located in front of the imaging element based on information on the rotational position of the shutter, detected by the shutter position detector.

6 Claims, 5 Drawing Sheets

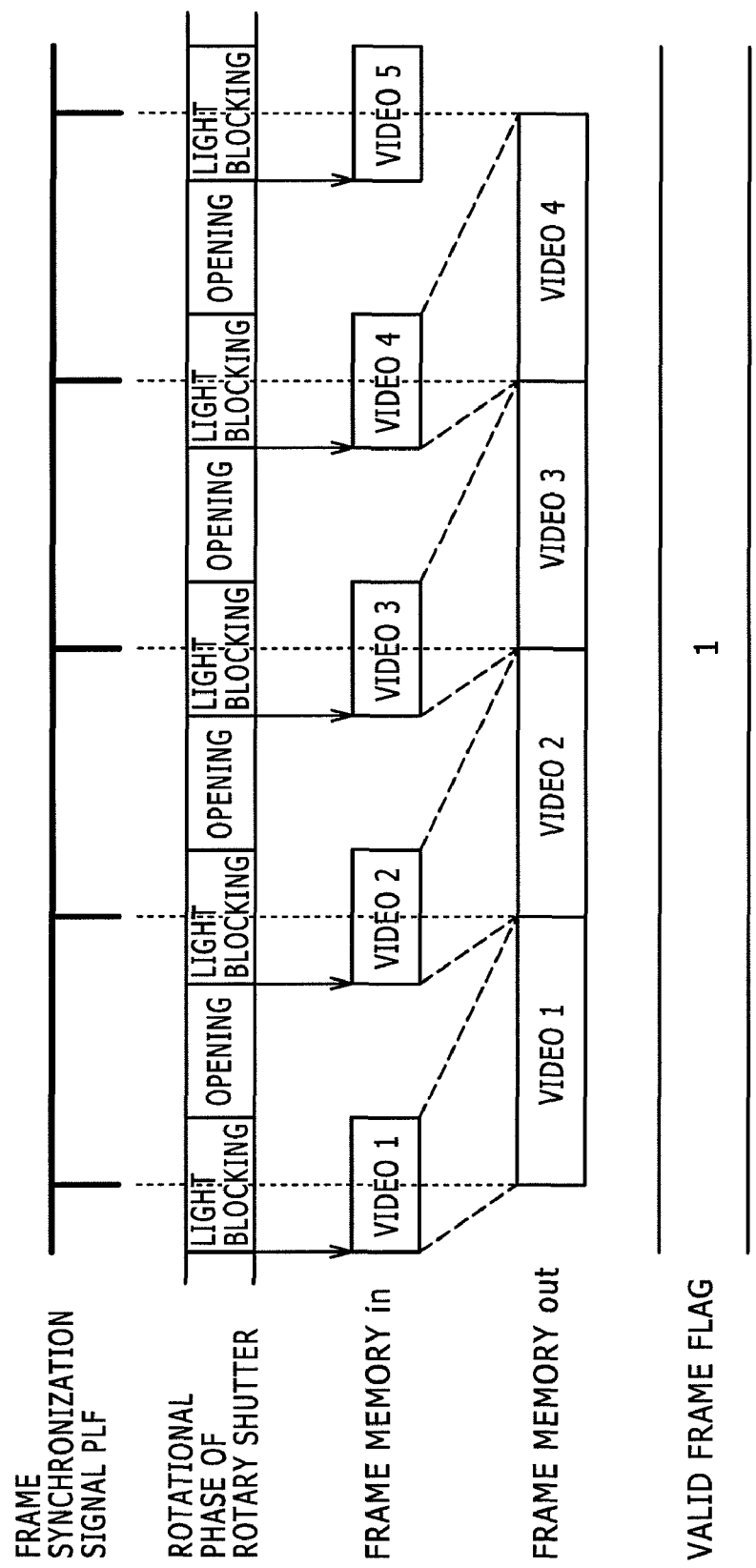

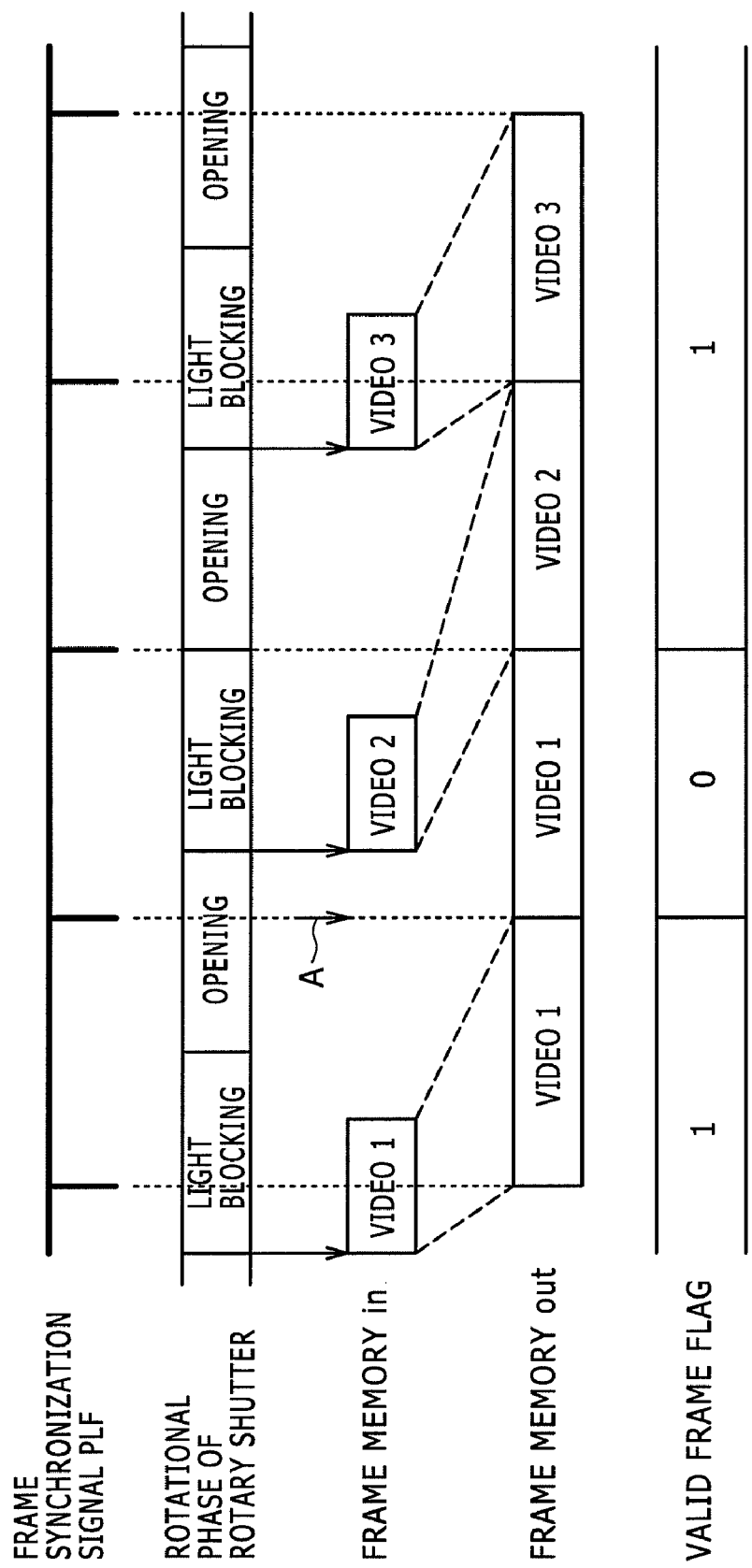

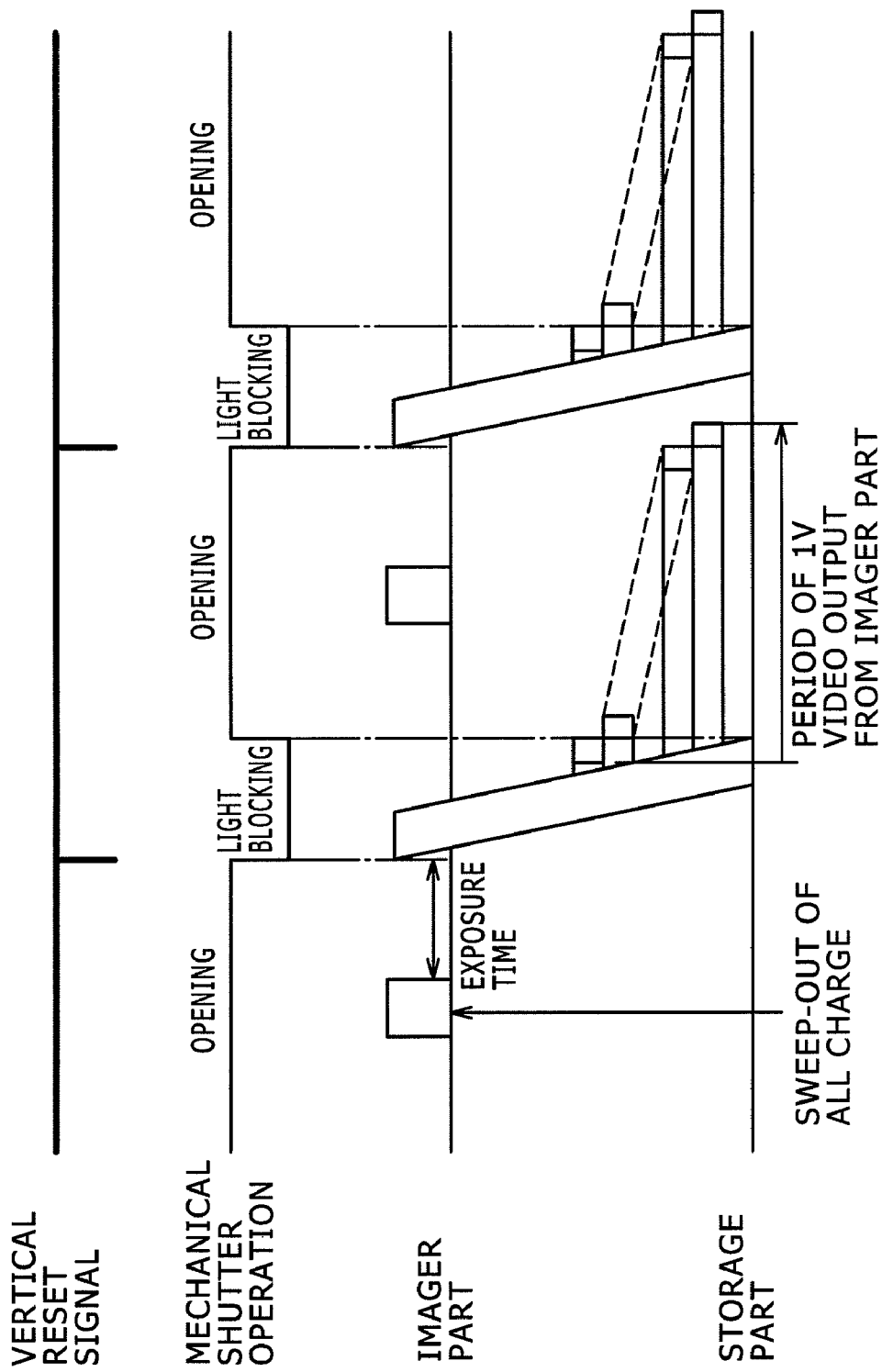

IMAGING DEVICE CONTAINING A ROTARY SHUTTER FOR FRAME RATE CONTROLLING

BACKGROUND OF THE INVENTION

1. Field of the Invention

The present invention relates to an imaging device and an imaging method that are suitable for application to e.g. an imaging device that can carry out variable speed ramping.

2. Description of the Related Art

In an imaging device employing a frame-transfer (FT) charge coupled devices (CCD) image sensor, the image area (light receiving part) is shielded from light during signal charge readout. Furthermore, in an imaging device employing a complementary metal oxide semiconductor (CMOS) image sensor, the image area is shielded from light during charge readout in order to achieve simultaneity of signal charge accumulation.

A scheme of using a rotary shutter is known as a method for shielding the image area from light. In general, the rotation of the rotary shutter is controlled in synchronization with the drive timing of the imaging element.

FIG. 5 shows the relationship between the operation of a rotary shutter and the drive timings of an imaging element in an FT-CCD. The FT-CCD includes an imager part (imaging area), a storage part (accumulation area), a horizontal transfer register, and a charge detector. FIG. 5 shows the correspondence between the operation in the imager part and the storage part and the operation of the mechanical shutter formed of the rotary shutter.

The uppermost row of FIG. 5 shows the output timings of a vertical reset signal for giving an instruction to transfer a charge from the imager part to the storage part. The next row shows the open/close operation of the mechanical shutter formed of the rotary shutter. The remaining rows show the operation in the imager part and the operation in the storage part. As the operation of FIG. 5, the operation in an imaging device that carries out variable speed control of the electronic shutter is taken as an example.

First, an all-pixel sweep-out signal for giving an instruction to sweep out all of the accumulated charge is input to the imager part. Thereupon, all of the charge that has been accumulated in the imager part until this timing is swept out. Thereafter, a charge is accumulated in the imager part until the vertical reset signal is input. This accumulation time serves as a so-called exposure time. Upon the input of the vertical reset signal, the charge is read out from the imager part and transferred to the storage part at high speed.

Simultaneously, in response to the input of the vertical reset signal, the rotational phase of the mechanical shutter is so controlled that a light-blocking part of the rotary shutter is disposed in front of the imaging element. Due to this operation, the image area is shielded from light during the period of the charge transfer from the imager part to the storage part.

For example, Japanese Patent Laid-open No. 2006-308841 discloses a shutter device that controls the period of the incidence of light to the imaging plane of a solid-state imaging element and the period of blocking of light to the imaging plane.

SUMMARY OF THE INVENTION

In recent years, there are an increasing number of occasions where photographing is carried out by a photographic method called variable speed ramping. The variable speed ramping refers to a way in which photographing is carried out with the frame rate (frame per second, hereinafter referred to as the FPS) smoothly changed differently from photographing with a fixed number of frames per second, such as 30 frames per second for video for television broadcasting and 24 frames per second for video for a film.

For example, if a walking person is photographed by the variable speed ramping and the obtained video is reproduced with a fixed number of frames, sharp video representation is possible, such as video representation in which this person walks slowly when waking on the far side but quickly passes on the near side suddenly. A user is often allowed to change the FPS in real time by operating a user interface (UI) such as a jog dial. In addition, e.g. a scheme of programming a FPS change curve in advance and executing the program is also employed.

The open/close interval of the rotary shutter varies in linkage with change in the rotational speed of the circular disk dependent on the input interval of the vertical reset signal, as shown in FIG. 5. The input interval of the vertical reset signal changes in accordance with the FPS specified by e.g. a user. That is, in the variable speed ramping, the open/close interval of the rotary shutter greatly changes in the time axis direction.

Also when the variable speed ramping is carried out, the light blocking needs to be kept during the charge transfer from the imager part to the storage part. Therefore, it is required that the rotational phase of the mechanical shutter is strictly controlled. However, if e.g. the rotational inertia of the circular disk of the rotary shutter is taken into consideration, the design of the servo control system of the rotary shutter is very difficult. Therefore, a high-torque, high-performance motor needs to be controlled by large current.

However, realization of such control is difficult in many cases, which naturally causes a limit to the change rate of the FPS. That is, the related-art imaging devices involve a problem that it is difficult to sufficiently satisfy the representation capability desired by users.

There is a need for the present invention to accurately match the timing of light blocking by a mechanical shutter to the timing of charge readout from an imager.

According to an embodiment of the present invention, there is provided an imaging device including an imaging element configured to carry out photoelectric conversion of subject image light incident through a lens and produce a video signal, and an imaging element controller configured to control the timing of readout of the video signal from the imaging element. Furthermore, the imaging device includes a circular disk shutter configured to have a light-blocking part that blocks incident light on the imaging element and a passage part through which incident light on the imaging element passes, and a shutter position detector configured to detect the rotational position of the shutter. Moreover, the imaging device includes a shutter controller configured to control the rotational speed of the shutter and cause the imaging element controller to start readout of a video signal from the imaging element when the light-blocking part of the shutter is located in front of the imaging element.

Due to this configuration, the readout of the video signal from the imaging element is carried out when the light-blocking part of the shutter is located in front of the imaging element.

According to the embodiment of the present invention, because the readout of the video signal from the imaging element is carried out when the light-blocking part of the shutter is located in front of the imaging element, the timing of the light blocking by the mechanical shutter accurately matches the timing of charge readout from the imager.

BRIEF DESCRIPTION OF THE DRAWINGS

FIG. 3 is a timing chart showing an example of the timings of writing and readout of a video signal to a frame memory when the frame synchronization frequency is the same as the frame rate, according to one embodiment of the present invention;

FIG. 4 is a timing chart showing an example of the timings of writing and readout of a video signal to the frame memory when the frame rate is lower than the frame synchronization frequency, according to one embodiment of the present invention; and FIG. 5 is a timing chart showing an example of charge transfer in a related-art FT-CCD.

DETAILED DESCRIPTION OF THE PREFERRED EMBODIMENT

One embodiment of the present invention will be described below with reference to FIGS. 1 to 4.
[Entire Configuration Example of Imaging Device]

Figure 1:
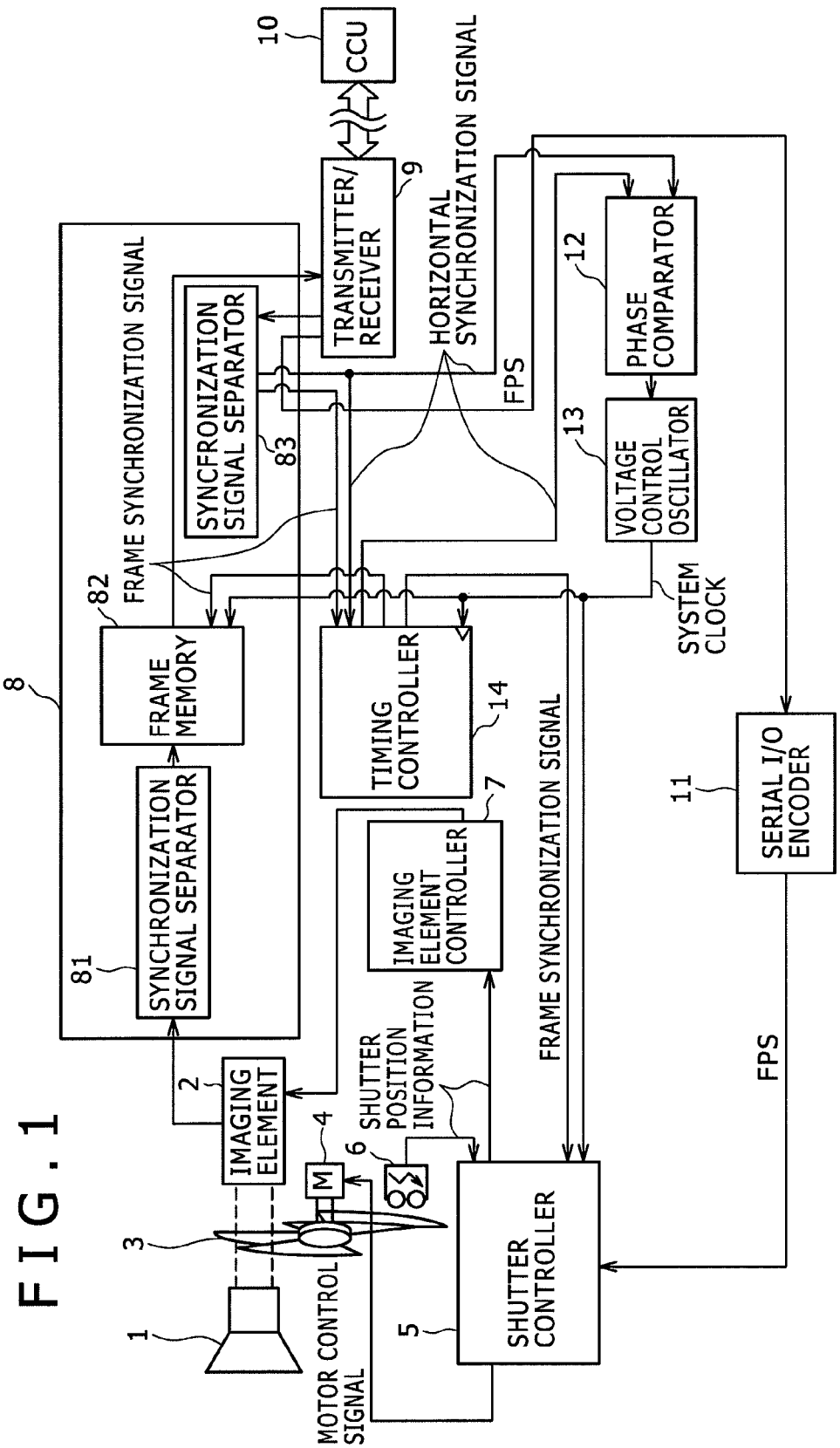
FIG. 1 is a block diagram showing a configuration example of a system according to one embodiment of the present invention.

FIG. 1 is a diagram showing a configuration example of an imaging device according to the present embodiment. The imaging device of the present embodiment is connected to a camera control unit 10 (hereinafter, referred to as the CCU 10). A video signal and a control signal are exchanged between the imaging device and the CCU 10 based on e.g. the high definition-serial digital interface (HD-SDI) standard.

The frame synchronization frequency of the imaging device is determined by a synchronization signal transmitted from the CCU 10. This frame synchronization frequency is used not only in the imaging device but also in a recording/reproducing device and a display device (neither of them is shown) connected to the imaging device, in a unified manner.

Information on the FPS, which defines the photographic interval of an imaging element 2, is also transmitted from the CCU 10. If the frame synchronization frequency is defined as P_F, the frame synchronization frequency P_F and the FPS are used with the relationship shown below.

P_F≧FPS

For example, in the case of an imaging device that can be driven with 240 P (240 frames/s progressive), the frame synchronization frequency is set to 240 P. In this case, the value of the FPS is set to any value in the range of 1 to 240 P by a user. The phase relationship between the frame synchronization frequency P_F and a video signal can be fixed to a certain phase relationship only when P_F is equal to the FPS. However, the phase relationship can not be locked when P_F is not equal to the FPS. That is, the phase relationship may be regarded as indefinite in general, and the value of the FPS can be freely set within a range not exceeding the frame synchronization frequency P_F without being restricted by P_F.

The imaging device shown in FIG. 1 includes a lens 1, the imaging element 2 that carries out photoelectric conversion of subject image light incident through the lens 1 to thereby produce a video signal, and a rotary shutter 3 for carrying out exposure or light blocking for the image area of the imaging element 2 with a predetermined interval. Furthermore, the imaging device includes a shutter drive motor 4 for rotational driving of the rotary shutter 3, a shutter controller 5 for controlling the shutter drive motor 4, and a shutter position detector 6 that detects the rotational position (rotational phase) of the rotary shutter 3 and outputs the rotational position to the shutter controller 5.

The imaging device further includes an imaging element controller 7 that controls the operation of the imaging element 2, a signal processor 8, a transmitter/receiver 9, a serial input/output (I/O) encoder 11, a phase comparator 12, a voltage control oscillator 13, and a timing controller 14.
[Details of Configuration Example of Imaging Device]

Figure 2:
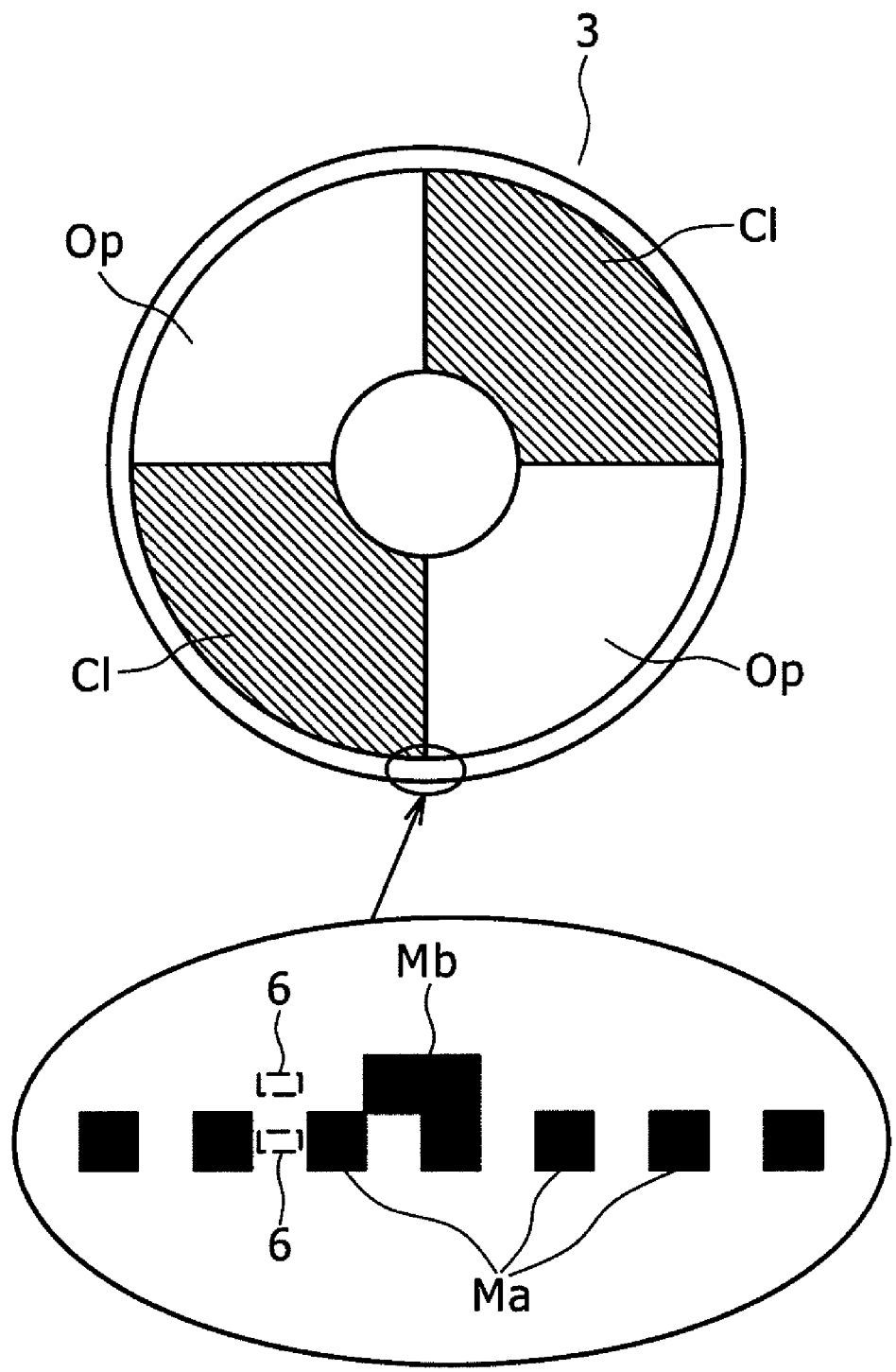
FIG. 2 is an explanatory diagram showing a structure example of a rotary shutter according to one embodiment of the present invention.

The imaging element 2 is formed of e.g. a CMOS sensor. The rotary shutter 3 is a circular disk having an opening part through which light passes at two places, and rotates based on control by the shutter drive motor 4. FIG. 2 shows a structure example of the rotary shutter 3. The rotary shutter 3 is composed of light-blocking parts C1 at two places, indicated by the hatched lines in the diagram, and opening parts Op as the other part. In one revolution of the rotary shutter 3, the light-blocking state and the opened state are repeated two times for each. Although the example in which the light-blocking parts C1 are provided at two places in the rotary shutter 3 is employed for the present embodiment, the embodiment is not limited to this structure but the light-blocking part C1 may be provided at one place, for example.

When the opening part Op of the rotary shutter 3 with this structure is disposed in front of the image area of the imaging element 2, subject light incident from the lens 1 is captured by the image area and a light reception signal is accumulated. On the other hand, when the light-blocking part C1 is disposed in front of the image area of the imaging element 2, a light reception signal is not accumulated in the image area.

In circumferential part of the circular disk of the rotary shutter 3, white and black markings Ma (first mark) indicating positions on the circumference are disposed with a predetermined equal interval. The number of markings Ma on the whole circumference is e.g. 30. The shutter position detector 6 detects the rotational position (phase) of the rotary shutter 3 by reading these markings. Specifically, the shutter position detector 6 causes the rising of a pulse signal Pa (first pulse signal) at the timing when the black marking is read by a sensor (not shown), and causes the falling of the pulse signal when the white marking is read.

Of the black markings provided on the circumference of the rotary shutter 3, only a marking at one position in the whole circumference is given a shape different from that of the other markings. At the timing when this marking Mb (second mark) is read, the shutter position detector 6 produces a pulse signal Pb (second pulse signal) having a different pulse width and supplies it to the shutter controller 5. Although the marking Mb (second mark), whose shape is made different from that of the other markings, is provided at one position in the whole circumference in the present embodiment, the embodiment is not limited thereto but the marking Mb may be provided at e.g. two positions in the whole circumference.

The shutter controller 5 includes a counter (not shown) for counting the number of times of the output of the pulse signal Pa, which is input from the shutter position detector 6. The value of this counter is reset at the timing of the input of the pulse signal Pb. This allows the shutter controller 5 to know, based on the count value Cr of the counter, the start point of a frame of a video signal and information on the physical position of the rotary shutter 3 such as information as to whether or not the rotary shutter 3 actually shields the imaging element 2 from light.

In the present embodiment, at the time of the arrival of the light-blocking part C1 of the rotary shutter 3 at such a position as to shield the imaging element 2 from light, the shutter controller 5 produces a frame start signal for giving an instruction to start readout of a frame and outputs the frame start signal to the imaging element controller 7. Specifically, the shutter controller 5 outputs a High-pulse as the frame start signal when the count value Cr has reached a predetermined count value Ct, and outputs a Low-pulse in the other case. The predetermined count value Ct is so properly set that the frame start signal is output at a timing immediately after the imaging element 2 is surely shielded from light by the rotary shutter 3, depending on the position of the imaging element 2 with respect to the rotary shutter 3, the interval of the black and white markings provided on the rotary shutter 3, and so on.

Although the frame start signal is produced based on the count value Cr of the counter provided in the shutter controller 5 in the present embodiment, the embodiment is not limited thereto. For example, through adjustment of the position and the number of markings Mb provided on the rotary shutter 3, a configuration may be employed in which the shutter controller 5 outputs the frame start signal at the timing of reading of the pulse signal Pb, which is output when the marking Mb is read. In this case, if each of the opening part Op and the light-blocking part C1 exists at two places in the circular disk like in the present embodiment, the marking Mb should be provided at two positions in the whole circumference. If each of the opening part Op and the light-blocking part C1 exists at one place in the whole circumference, the marking Mb should also be provided at one position in the whole circumference. In addition, the marking Mb should be located at such a position that the marking Mb is read at a timing immediately after the light-blocking part C1 of the rotary shutter 3 is surely disposed in front of the imaging element 2.

The shutter controller 5 controls the rotational speed of the rotary shutter 3 based on the FPS information transmitted from the CCU 10. To the shutter controller 5, shutter position information output from the shutter position detector 6 is also input together with the FPS information. Based on these pieces of information, the shutter controller 5 produces a motor control signal that is so modified as to absorb the error between the target rotational position (phase) of the rotary shutter 3, defined based on the FPS information, and the actual rotational position (phase) detected by the shutter position detector 6. The produced motor control signal is supplied to the shutter drive motor 4. That is, a feedback loop is formed by the shutter position detector 6, the shutter controller 5, and the shutter drive motor 4.

The imaging element controller 7 drives horizontal and vertical scanning circuits (not shown) for the imaging element 2 to thereby control signal charge readout. Upon receiving the frame start signal from the shutter controller 5, the imaging element controller 7 outputs to the imaging element 2 a synchronization signal for giving an instruction to read out a video signal corresponding to one screen (frame). The video signal corresponding to one screen, read out from the imaging element 2, is output to the signal processor 8. The synchronization signal for giving an instruction to read out the video signal corresponding to one screen is not output during the period when the frame start signal is not input from the shutter controller 5.

That is, the readout of the video signal from the imaging element 2 is carried out only when the frame start signal is input from the shutter controller 5. At the timing when the frame start signal is output from the shutter controller 5, the light-blocking part C1 of the rotary shutter 3 should be already disposed in front of the imaging element 2 based on control by the shutter controller 5. Thus, the readout of the video signal from the imaging element 2 is carried out during light blocking invariably.

The signal processor 8 executes, for the video signal read out from the imaging element 2, clamp processing for fixing the black level of the video signal at a constant reference value, edge enhancement processing for highlighting the contours, gamma correction for adjusting the gamma value in matching with the gamma characteristic of the display device, and so on. In FIG. 1, illustration of the module that executes these kinds of processing is omitted.

The signal processor 8 has, in addition to the module for these kinds of processing, a synchronization signal separator 81 that separates a synchronization signal from the video signal output from the imaging element 2, a frame memory 82 that stores the video signal corresponding to one screen, and a synchronization signal separator 83 that separates a synchronization signal superimposed on return video transmitted from the CCU 10.

The synchronization signal separator 81 produces the synchronization signal by separating synchronization codes, such as SAV (start of active video) and EAV (end of active video), superimposed on the input video signal, and supplies the video signal and the synchronization signal to the frame memory 82. The frame memory 82 is formed of e.g. an asynchronous first-in first-out (FIFO) memory, and writes the video signal in such a manner as to keep frame synchronization by the synchronization signal supplied from the synchronization signal separator 81.

On the other hand, readout of the video signal from the frame memory 82 is carried out in synchronization with a frame synchronization signal supplied from the CCU 10. Details of the processing at the time of the readout of the video signal will be described later.

The transmitter/receiver 9 converts the video signal output from the frame memory 82 in the signal processor 8 to a frequency multiplexed signal such as an HD-SDI signal and transmits the signal to the CCU 10. In addition, the transmitter/receiver 9 executes processing of encoding the frequency multiplexed signal transmitted from the CCU 10. The transmitter/receiver 9 outputs a signal of return video obtained through the encoding to the synchronization signal separator 83 and outputs serial data in which FPS information and so on is described to the serial I/O encoder 11. The serial I/O encoder 11 writes the input serial data to the module that requires the information of the serial data. When FPS information is transmitted as the serial data, the serial I/O encoder 11 supplies the FPS information to the shutter controller 5.

The synchronization signal separator 83 separates synchronization codes, such as SAV and EAV, superimposed on the video signal to thereby extract a horizontal synchronization signal H and a frame synchronization signal F. The synchronization signal separator 83 outputs the extracted horizontal synchronization signal H to the timing controller 14 and the phase comparator 12 and outputs the frame synchronization signal F to the timing controller 14. The timing controller 14 produces a free-running horizontal synchronization signal PH having the same cycle as that of the horizontal synchronization signal H supplied from the synchronization signal separator 83 and outputs it to the phase comparator 12.

The phase comparator 12 detects the phase difference between the horizontal synchronization signal H input from the synchronization signal separator 83 and the free-running horizontal synchronization signal PH input from the timing controller 14. The phase comparator 12 produces the voltage dependent on the detected phase difference and supplies the voltage to the voltage control oscillator 13. The voltage control oscillator 13 changes the oscillation frequency depending on the supplied voltage to thereby carry out such adjustment as to eliminate the phase difference between the horizontal synchronization signal H input from the synchronization signal separator 83 and the free-running horizontal synchronization signal PH. Furthermore, the voltage control oscillator 13 outputs a system clock CK having such an oscillation frequency that the phase is locked to the horizontal synchronization signal H to the timing controller 14, the frame memory 82, and the shutter controller 5.

To the timing controller 14, the frame synchronization signal F separated by the synchronization signal separator 83 is also input. That is, the timing controller 14 operates in synchronization with not only the horizontal synchronization signal H transmitted from the CCU 10 but also the frame synchronization signal F. Furthermore, the timing controller 14 supplies a horizontal synchronization signal PLF and a frame synchronization signal PLF resulting from phase adjustment to the frame memory 82 and the shutter controller 5.

[Operation Examples of Imaging Device]

Operation examples of the imaging device will be described below with reference to the timing charts of FIG. 3 and FIG. 4, which show examples of the timings of writing and readout of a video signal to and from the frame memory 82. The uppermost row in FIG. 3 and FIG. 4 shows the output timings of the frame synchronization signal PLF. On the next row, the rotational phase of the rotary shutter 3 is shown as "light blocking" and "opening." The next two rows show the timings of the writing of the video signal to the frame memory 82 and the timings of the readout of the video signal from the frame memory 82, respectively. The lowermost row shows the value of a valid frame flag.

The valid frame flag refers to a flag indicating whether the video signal read out from the frame memory 82 corresponds to a valid image or an invalid image. The value of the valid frame flag is 1 when the video signal corresponds to a valid image, whereas the value is 0 when the video signal corresponds to an invalid image. If the FPS is lower than the frequency of the frame synchronization signal PLF (frame synchronization frequency), the number of times of the writing of the video signal to the frame memory 82 based on the FPS is smaller than the number of times of the readout of the video signal from the frame memory 82. In this case, there is a possibility that the image accumulated in the frame memory 82 is the same as the image read out at the previous time, depending on the readout timing. In such case, the same image as the image read out at the previous time is read out or a black image is output. The same image as the previous image, a copy image, and a black image for this case are referred to as the invalid image, and the other images are referred to as the valid image.

The valid frame flag is set to 0 when an invalid image is output, and the image of a frame whose valid frame flag is 0 is deleted in recording of the video signals in a recording medium or the like (not shown). This allows only the frames photographed based on the FPS to be recorded in the recording medium. The value of the valid frame flag is superimposed on e.g. one bit of ancillary data of an HD-SDI signal and transmitted to the CCU 10.

FIG. 3 shows an example of the timings of writing and readout of the video signal to and from the frame memory 82 when the frame synchronization frequency is the same as the FPS. FIG. 4 shows an example of the timings when the FPS is lower than the frame synchronization frequency.

First, the example of FIG. 3, in which the frame synchronization frequency is the same as the FPS, will be described below. In the present embodiment, the writing of the video signal to the frame memory 82 is carried out in the period during which the rotary shutter 3 shields the imaging element 2 from light, and the readout of the video signal from the frame memory 82 is carried out in synchronization with the frame synchronization signal PLF supplied to the entire camera system. Therefore, if the frequency of the frame synchronization signal PLF is the same as the FPS, the image based on the video signal written to the frame memory 82 and the image based on the video signal read out from the frame memory 82 have a one-to-one correspondence. Accordingly, the valid frame flag is invariably set to 1.

On the other hand, as shown in FIG. 4, if the FPS is lower than the frame synchronization frequency, the number of times of the writing of the video signal to the frame memory 82 based on the FPS is smaller than the number of times of the readout of the video signal from the frame memory 82. In the example shown in FIG. 4, at the time of the start of the second readout, of four times of the readout from the frame memory 82, i.e. when the frame synchronization signal PLF indicated by "A" in the diagram is input, "Video 1," which is the same video as the video read out in the first readout, is still accumulated in the frame memory 82. At this timing, the writing of the next "Video 2" has not yet been started. When such a condition is satisfied, "Video 1" is output from the frame memory 82 again and the value of the valid frame flag is set to 0. The variable speed ramping is realized by recording only the video of the frames whose valid frame flag value is 1.

[Effects of Embodiment]

In the above-described embodiment, the readout of the video signal from the imaging element 2 is carried out in response to triggering by the frame start signal produced based on the position information of the rotary shutter 3. In addition, the rotational phase of the rotary shutter 3 is so controlled that the imaging element 2 is shielded from light at the time of the output of the frame start signal. Due to this feature, invariably the readout of the video signal from the imaging element 2 is carried out during light blocking even when jitter occurs in the rotation of the rotary shutter 3.

Furthermore, in the above-described embodiment, invariably the readout of the video signal from the imaging element 2 is carried out during light blocking even when the FPS value is changed in the photographing and thus the rotational speed of the rotary shutter 3 is suddenly changed. This allows sharp change in the FPS and thus allows sharp video representation.

Furthermore, in the above-described embodiment, the rotation of the rotary shutter 3 is not synchronized with the drive timing of the imaging element 2. Therefore, the rotational phase and speed of the rotary shutter 3 do not need to be precisely controlled in matching with the readout timing of the imaging element 2. This eliminates the need to employ a servo mechanism that is expensive and difficult to design and a high-torque, high-accuracy motor and thus can reduce the manufacturing cost of the imaging device.

Moreover, in the above-described embodiment, the readout of the video signal from the frame memory 82 is carried out in synchronization with the frame synchronization signal PLF supplied to the entire camera system. Therefore, even if fluctuation in the time axis direction occurs in the video output due to rotational jitter of the rotary shutter 3 and so on, this fluctuation is absorbed at the time of the readout of the video signal from the frame memory 82.

Although the example in which the FPS information is transmitted from the CCU 10 is employed for the above-described embodiment, it is also possible to apply the embodiment to a configuration in which the input of the FPS value is accepted through an operation input part or the like provided in the imaging device.

The present application contains subject matter related to that disclosed in Japanese Priority Patent Application JP 2008-183983 filed with the Japan Patent Office on Jul. 15, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
an imaging element configured to carry out photoelectric conversion of subject image light incident through a lens and produce a video signal;
an imaging element controller configured to control timing of readout of the video signal from the imaging element;
a circular disk shutter configured to have a light-blocking part that blocks incident light on the imaging element and a passage part through which incident light on the imaging element passes, the shutter being driven to rotate by a motor;
a shutter position detector configured to detect a rotational position of the shutter; and
a shutter controller configured to control a rotational speed of the shutter and cause the imaging element controller to start readout of a video signal from the imaging element when the light-blocking part of the shutter is located in front of the imaging element based on information on the rotational position of the shutter, detected by the shutter position detector, wherein
the shutter controller produces a frame start signal indicating start of a frame and outputs the frame start signal to the imaging element controller if it is determined by the shutter controller that the light-blocking part is disposed in front of the imaging element based on information on the rotational position of the shutter, detected by the shutter position detector, and
upon receiving the frame start signal, the imaging element controller supplies a synchronization signal, for reading out a video signal corresponding to one screen from the imaging element, to the imaging element.

2. The imaging device according to claim 1, wherein
the shutter controller controls the rotational speed of the shutter based on a frame rate specified by a user.

3. The imaging device according to claim 2, further comprising:
a frame memory configured to accumulate a video signal corresponding to one screen, read out from the imaging element; and
a timing controller configured to produce a frame synchronization signal for driving units in the imaging device, wherein
readout of a video signal from the frame memory is carried out in synchronization with a frame synchronization signal supplied from the timing controller.

4. The imaging device according to claim 1, wherein
the circular disk shutter has, on a circumferential part of the shutter, a first mark disposed with a predetermined interval and a second mark disposed with an interval longer than the interval of the first mark,
the shutter position detector produces a first pulse signal at a timing when the first mark is read, and produces a second pulse signal at a timing when the second mark is read, and
the shutter controller includes a counter that counts the number of times of output of the first pulse signal and produces the frame start signal in response to arrival of a count value of the counter at a predetermined value, and the counter value is reset when the second pulse signal is received.

5. The imaging device according to claim 1, wherein
a mark is provided on a circumferential part of the circular disk shutter at one position per one group of the passage part and the light-blocking part that are disposed continuously with each other, and the mark is provided at such a position that the light-blocking part shields the imaging element from light when the mark is read by the shutter position detector,
the shutter position detector produces a pulse signal at a timing when the mark is read, and
the shutter controller produces the frame start signal upon receiving the pulse signal.

6. An imaging method comprising the steps of:
carrying out photoelectric conversion of subject image light incident through a lens and producing a video signal;
detecting a rotational position of a circular disk shutter having a light-blocking part that blocks incident light on an imaging element and a passage part through which incident light on the imaging element passes; and
controlling a rotational speed of the shutter and starting readout of a video signal from the imaging element when the light-blocking part of the shutter is located in front of the imaging element based on information on the detected rotational position of the shutter, wherein
a shutter controller produces a frame start signal indicating start of a frame and outputs the frame start signal to an imaging element controller if it is determined that the light-blocking part is disposed in front of the imaging element based on information on the rotational position of the shutter, and
upon receiving the frame start signal, an imaging element controller supplies a synchronization signal, for reading out a video signal corresponding to one screen from the imaging element, to the imaging element.

* * * * *